United States Patent
Ohtani et al.

(10) Patent No.: US 6,953,636 B2
(45) Date of Patent: Oct. 11, 2005

(54) PRESS SEPARATOR FOR FUEL CELL MADE OF STAINLESS STEEL PRESS FORMED IN CONTIGUOUS CORRUGATIONS

(75) Inventors: Teruyuki Ohtani, Wako (JP); Makoto Tsuji, Wako (JP); Masao Utsunomiya, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 138 days.

(21) Appl. No.: 10/169,800

(22) PCT Filed: Nov. 6, 2001

(86) PCT No.: PCT/JP01/09685

§ 371 (c)(1),
(2), (4) Date: Nov. 4, 2002

(87) PCT Pub. No.: WO02/39530

PCT Pub. Date: May 16, 2002

(65) Prior Publication Data

US 2004/0253503 A1 Dec. 16, 2004

(30) Foreign Application Priority Data

Nov. 10, 2000 (JP) ........................................ 2000-344298

(51) Int. Cl.$^7$ ........................... H01M 2/00; C22C 27/06; B32B 15/04
(52) U.S. Cl. ........................... 429/34; 429/38; 420/428; 420/442; 428/457
(58) Field of Search ........................ 429/34, 12; 148/325, 148/326, 327, 605–611; 134/3, 41, 27; 420/34, 43, 56, 64, 94, 103, 121, 428, 581, 588, 583, 584.1, 441, 442; 428/457; 252/519.14, 521.2

(56) References Cited

FOREIGN PATENT DOCUMENTS

EP 1046723 * 10/2000 ............ C22C/38/18

OTHER PUBLICATIONS

International Search Report.
Patent Abstracts of Japan. JP 08–311620. Nov. 26, 1996.
Patent Abstracts of Japan. JP 10–302814. Nov. 13, 1998.
Patent Abstracts of Japan. JP 2000–328200. Nov. 28, 2000.
Patent Abstracts of Japan. JP 2000–328205. Nov. 28, 2000.
Patent Abstracts of Japan. JP 2001–032056. Feb. 06, 2001.

* cited by examiner

*Primary Examiner*—Raymond Alejandro
(74) *Attorney, Agent, or Firm*—Sughrue Mion, PLLC

(57) ABSTRACT

A press separator made of a stainless steel sheet, for providing excellent corrosion resistance and electric conductivity by a combination of a passive coating and a deposition of boride or boron carbide, restriction corrosion without separation or coming-off, by press forming, of depositions, and ensuring an extended service. A stainless steel sheet, containing 0.005–1.5 wt. %, of B and having deposited on the surface thereof at least one kind out of $M_{23}(C, B)_6$ type boron carbide, and $M_2B$ type and MB type borides, is press-formed in a corrugated shape having continuous irregularities, with angles of bent portions formed by bending or unbending by press forming being set at at least 15 degrees and an outward bending R-value at up to 1 mm.

2 Claims, 8 Drawing Sheets

PRESS SEPARATOR FOR FUEL CELL MADE OF STAINLESS STEEL PRESS FORMED IN CONTIGUOUS CORRUGATIONS

TECHNICAL FIELD

The present invention relates to a separator for forming a gas passage in a solid high polymer fuel cell, and more particularly, relates to a press separator for a fuel cell formed in continuous corrugations by press forming of a stainless steel plate.

BACKGROUND ART

A solid high polymer fuel cell is formed by laminating positive and negative electrode catalyst layers (cathode and anode) on both sides of an electrolyte membrane made of ion exchange resin or the like, and further laminating gas diffusion layers on these electrode catalyst layers to form an electrode structure, which is called a unit cell. Plural unit cells are laminated on both sides of a separator, and a practical fuel cell stack is formed. The separator is made of a material having an electron transmitting function, and has multiple gas passages formed like grooves for independently circulating fuel gas using hydrogen and oxidizer gas such as oxygen or air, and is placed between unit cells in a state contacting with the gas diffusion layer.

In such fuel cells, for example, by circulating hydrogen gas as a fuel gas in the gas passage of the separator at the negative electrode side, and circulating oxidizing gas such as oxygen or air in the gas passage of the separator at the positive electrode side, an electrochemical reaction takes place, and electricity is generated. During generation of electricity, the gas diffusion layer transmits electrons generated by electrochemical reaction between the electrode catalyst layer and the separator, and diffuses fuel gas and oxidizing gas at the same time. The electrode catalyst layer at the negative electrode side induces a chemical reaction in the fuel gas, and generates protons and electrons, while the electrode catalyst layer at the positive electrode side produces water from oxygen, protons, and electrons, and the electrolyte membrane transmits protons ionically. Thus, electrical power is drawn out through the positive and negative electrode catalyst layers.

Hitherto, the separator was mainly made of graphite material, and the gas passages were formed by cutting grooves. Graphite materials include gas impermeable graphite having resin such as phenol resin impregnated in baked isotropic graphite, amorphous carbon having resin such as phenol resin baked after forming, and composite material made of resin and graphite. These graphite materials are high in hardness, and it was difficult to form gas passages, or mechanical strength and impact resistance were poor.

In light of such problems, recently, it has been proposed to use new materials that can overcome the problems of the graphite materials, such as press-formed materials of thin metal plates of aluminum, titanium, stainless steel, or the like. Among these, stainless steel has a passive film on the surface and is superior in corrosion resistance. However, when the stainless steel is used in the separator of a fuel cell, catalyst poisoning or conductivity reducing of electrode membrane may be caused by eluting ions. Moreover, since the electrical resistance of the passive film is high, the contact resistance increases at the contact interface of the separator and the electrode structure.

As means for solving these problems, a separator made of gold-plated stainless steel was proposed in Japanese Patent Application Laid-open No. 10-228914. It has also been attempted to enhance the corrosion resistance and conductivity by precipitating conductive boride or boron carbide from inside stainless steel, and exposing the precipitates on the surface together with the passive film.

Of these conventional means of solution, the former method incurs a very high manufacturing cost. Alternatively, if the gold plating is exposed to friction by vibration or the like, the gold plating is likely to peel off at the interface with the stainless steel, and it is not suited to long-term use. Moreover, if there is a pin hole or other defect, corrosion originates therefrom. In the latter means, on the other hand, the material becomes brittle due to precipitates appearing on the surface, and when bent by press forming, the precipitates separate or fall off from the bent portion, and corrosion is initiated from the fall off marks, and this is also not suited to long-term use.

DISCLOSURE OF THE INVENTION

It is hence an object of the invention to provide a press separator for fuel cell capable of obtaining superior corrosion resistance and conductivity by combination of passive film and precipitates of boride or boron carbide, suppressing occurrence of corrosion without causing separation or fall off of precipitates due to press forming, and which withstands long-term use.

The invention is characterized by using a stainless steel plate comprising B by 0.005 to 1.5 wt. %, with at least one of $M_{23}(C, B)_6$ type boron carbide, $M_2B$ type, and MB type borides precipitating on the surface, being press formed in continuous corrugations, in which the angle of a bent portion formed by folding or elongating in press forming is 15 degrees or more, and the outer bending radius R is 1 mm or less.

According to the separator of the invention, many grooves formed on the surface and reverse sides by press forming corrugations are used as gas passages of fuel gas or oxidizing gas. In the separator of the invention, since at least one type of the precipitates of boron carbide and borides is exposed on the surface, in addition to the high corrosion resistance realized by the passive film on the surface which is one of the characteristics of stainless steel, the corrosion resistance is further enhanced, and ion elution amount is reduced at the same time, and a high conductivity is obtained. Furthermore, generation of harmful ions and products is suppressed by the passive film and precipitates, and the constituent parts of the fuel cell such as electrolyte film or electrode catalyst layer, or piping and other parts are not damaged by discharge of such harmful substances.

Precipitates render materials brittle as mentioned above, and when bent and folded in press forming, precipitates may separate or fall off from the bent portion, and corrosion may be initiated from the fall off marks. In the invention, however, since B is contained by 0.005 to 1.5 wt. %, precipitates are prevented from separating or falling off from the bent portion by this defined content.

Boron is an important element of conductive inclusions precipitated on the surface, and 0.005 wt. % or more is required from the viewpoint of satisfying the necessary precipitate amount to obtain the contact resistance necessary for the separator. If it exceeds 1.5 wt. %, however, the precipitate amount is excessive, and cracks or gaps may be formed, if not reaching the state of separation or fall off, on the outer surface of the bent portion formed by press forming, and corrosion may be initiated from such defect. Therefore, the content of B is defined to be in a range of 0.005 to 1.5 wt. %.

Gas passages of the separator of the invention are formed as grooves in the surface and reverse sides of a stainless steel plate by press forming in corrugations, and the angle of the bent portion for forming gas passages is defined to be 15 degrees or more, and the outer bending radius R is 1 mm or less. FIGS. 1A and B show a partial section of the separator obtained by press forming of a stainless steel plate in corrugations. A separator 1 in FIG. 1A has a gas passage 1b formed in an isosceles triangle in which the angle θ of a bent portion 1a is 90 degrees. A separator 2 in FIG. 1B has a gas passage 2b formed in a trapezoidal form in which the angle θ of a bent portion 2a is 45 degrees. In the invention, the radius of curvature of the outer side of the bent portion is the outer bending radius R.

Fuel gas or oxidizing gas flows in the gas passage of the separator, but since the gas is consumed when contacting with the electrode structure, the gas passage is required to have a certain depth in order to maintain a necessary flow rate. From the viewpoint of the section of gas passage, a certain height (depth) is required against the width of the gas passage. Supposing the width of the section to be W, the maximum depth formed at the angle θ of a bent portion is 0.5 W tan θ, and the sectional area is the maximum at this time. That is, assuming the ratio of the width and depth of section at this time, 0.5 W tan θ/W=0.5 tan θ, to be a parameter, the depth of the gas passage can be determined by applying this parameter.

FIG. 3 shows results of measurement of generated voltages at 0.4 A/cm² power generation of a unit cell in fuel cells, in which a 0.2 mm thick stainless steel of the composition of the invention is press-formed at a constant 0.5 mm of the outer bending radius R of bent portion while varying the angle of the bent portion to form separator and a fuel cell stack is formed by using the separators. As is understood from this graph, when the angle of the bent portion is 15 degrees or more, the power generation efficiency is very high as compared with the angle of less than 15 degrees. Hence, in the invention, the angle of the bent portion for forming the gas passage is defined to be 15 degrees or more.

The gas passages are required to have proper characteristics to allow gases to flow smoothly so that the fuel gas and oxidizing gas may be sufficiently supplied into the electrode structure facing the gas passages to assure a specified power generation efficiency. However, as shown in FIG. 2, a slight gap (shaded area in FIG. 2) is formed between the outer side of the bent portion 3a of the separator 3 and the electrode structure 10 because the outer surface of the bent portion 3a is a curved surface, and the gas tends to be stagnant in this gap. The gas is supplied sufficiently into the electrode structure by minimizing this gap.

FIG. 4 shows results of measurement of generated voltage at 0.4 A/cm² power generation of a unit cell in fuel cells, in which a 0.2 mm thick stainless steel of the composition of the invention is press-formed at a constant 45 degrees of the bent portion while varying the outer bending radius R of bent portion to form a separator and a fuel cell stack is formed by using the separators. As is understood from this graph, when the outer bending angle R is 1 mm or less, the power generation efficiency is very high as compared with the case of over 1 mm. Hence, in the invention, the outer bending radius R of the bent portion for forming the gas passage is defined to be 1 mm or less.

The invention is also characterized by using an austenitic stainless steel comprising B: 0.005 to 1.5 wt. %, C: 0.15 wt. % or less, Si: 0.01 to 1.5 wt. %, Mn: 0.01 to 2.5 wt. %, P: 0.035 wt. % or less, S: 0.01 wt. % or less, Al: 0.001 to 0.2 wt. %, N: 0.3 wt. % or less, Cu: 0 to 3 wt. %, Ni: 7 to 50 wt. %, Cr: 17 to 30 wt. %, Mo: 0 to 7 wt. %, and balance of Fe and inevitable impurities, with contents of Cr, Mo, and B satisfying the following formula:

$$Cr(wt. \%)+3 \times Mo(wt. \%)-2.5 \times B(wt. \%) \geq 17,$$

precipitating at least one of $M_{23}(C, B)_6$ type boron carbide, $M_2B$ type, and MB type borides on the surface, and being press formed in continuous corrugations, in which the angle of a bent portion formed by folding or elongating in press forming is 15 degrees or more and the outer bending radius R is 1 mm or less.

The reasons for setting the numerical values of the contents of the elements except B are explained below.

C: 0.15 wt. % or Less

The content of C is preferred to be as low as possible in order to assure the cold toughness and ductility to satisfying press forming performance suited to mass production, and hence it is defined to be 0.15 wt. % or less in the invention.

Si: 0.01 to 1.5 wt. %

Si is effective as a deoxidizing element, but if it is less than 0.01 wt. %, the deoxidizing effect is not sufficient, or if it exceeds 1.5 wt. %, the ductility is reduced and the press forming performance is impeded. Hence, the content of Si is defined to be in a range of 0.01 to 1.5 wt. %

Mn: 0.01 to 2.5 wt. %

Mn is necessary as a deoxidizing element, and is also added as a balance adjusting element of Ni. It also functions to solidify mixed S which is an inevitable impurity as a sulfide of Mn. These functions are exhibited when the content of Mn is 0.01 wt. % or more, but if it exceeds 2.5 wt. %, the ion elution amount increases, and in particular, when the electrolyte membrane is a sulfonic acid compound, it bonds with a sulfonic acid radical, and the ion conductivity of the electrolyte member is lowered. Hence, the content of Mn is defined to be in a range of 0.01 to 2.5 wt. %.

P: 0.035 wt. % or Less

P is an element inevitably mixed in, and its content should be as low as possible. Considering that the precipitate (inclusion) containing P may be the origin of corrosion under the fuel cell condition, the content of P is defined to be at 0.035 wt. % or less.

S: 0.01 wt. % or Less

Due to the same reasons as for P, the content of S is defined to be at 0.01 wt. % or less.

Al: 0.001 to 0.2 wt. %

Al is added in the steel melting stage as a deoxidizing element, and is contained in a range of 0.001 to 0.2 wt. %. Since B in the steel is an element having a strong bonding power with oxygen in the molten steel, the oxygen concentration must be lowered by the deoxidizing action of Al.

N: 0.3 wt. % or Less

Due to the same reasons as for C, the content of N is defined to be at 0.3 wt. %.

Cu: 0 to 3 wt. %

As required, Cu is contained at 3 wt. % or less. When a proper amount of Cu is contained, passivation is promoted, and it is effective to prevent elution of metal in the separator environment. The content is preferred to be 0.01 wt. % or more, but when it exceeds 3 wt. %, the processing efficiency in hot process is lowered, and mass production is difficult. Hence, the content of Cu is defined to be in a range of 0 to 3 wt. %

Ni: 7 to 50 wt. %

Ni is an important element for making austenitic metallographically. The manufacturing property, corrosion resistance, and forming performance are assured by making austenitic. When the content of Ni is less than 7 wt. %, it is difficult to form an austenitic texture, and if it exceeds 50 wt. %, it becomes too costly. Hence, the content of Ni is defined to be in a range of 7 to 50 wt. %. Meanwhile, Ni is slightly contained in $M_2B$ type boride.

Cr: 17 to 30 wt. %

The higher the content of Cr, the higher the corrosion resistance, but toughness and ductility at ordinary temperatures are reduced. Considering the balance of corrosion resistance and toughness and ductility, the content of Cr is defined to be in a range of 17 to 30 wt. % in the invention.

Mo: 0 to 7 wt. %

The higher the content of Mo, the higher the corrosion resistance; however, the material becomes brittle. So as not to be brittle, in the invention, the content of Mo is defined to be in a range of 0 to 7 wt. %

$$Cr(wt. \%)+3\times Mo(wt. \%)-2.5\times B(wt. \%) \geq 17,$$

Since B consumes Cr and Mo in the stainless steel to produce borides and boron carbides, the contents of Cr and Mo as corrosion prevention improving elements contained in the base material are reduced, and the corrosion resistance of the base material is reduced, and hence this formula is defined.

In other aspects, the invention is characterized by using a ferritic stainless steel comprising B: 0.005 to 1.5 wt. %, C: 0.15 wt. % or less, Si: 0.01 to 1.5 wt. %, Mn: 0.01 to 1.5 wt. %, P: 0.035 wt. % or less, S: 0.01 wt. % or less, Al: 0.001 to 0.2 wt. %, N: 0.035 wt. % or less, Cu: 0 to 1 wt. %, Ni: 0 to 5 wt. %, Cr: 17 to 36 wt. %, Mo: 0 to 7 wt. %, and balance of Fe and inevitable impurities, with the contents of Cr, Mo, and B satisfying the following formula:

$$Cr(wt. \%)+3\times Mo(wt. \%)-2.5\times B(wt. \%) \geq 17,$$

precipitating at least one of $M_{23}(C, B)_6$ type boron carbide, $M_2B$ type, and MB type borides on the surface, and being press formed in continuous corrugations, in which the angle of a bent portion formed by folding or elongating in press forming is 15 degrees or more and the outer bending radius R is 1 mm or less. The contents of Mn, N, Cu, and Ni in this separator are slightly different from the contents in the separator composed of the austenitic stainless steel mentioned above, but the reasons for setting the upper and lower limits of these numerical values are the same as explained above.

Furthermore, in the press separator for fuel cells of the invention, stainless steel plates including austenitic stainless steel plates and ferritic stainless steel plates are preferred to be steel plates finished by bright annealing, and by this bright annealing process, formation of a de-B layer can be prevented in the surface layer which cannot be prevented from oxidation in air, and decrease in the number of conductive inclusions exposed after pickling can be prevented.

BEST MODE FOR CARRYING OUT THE INVENTION

The effects of the invention are demonstrated by presenting Examples below.

(1) Relationship Between B Content and Outer Bending Radius R (Austenitic Stainless Steel)

Figure 1A:
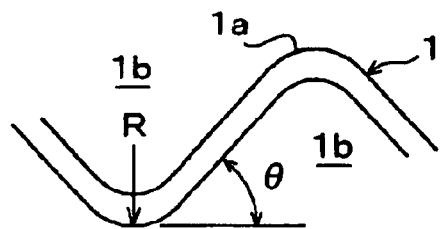
FIG. 1A is a partial sectional view conceptually showing a separator of the invention.
Figure 1B:
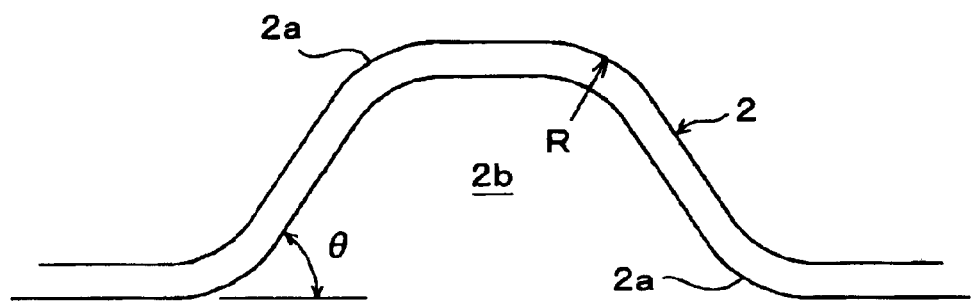
FIG. 1B is a partial sectional view conceptually showing a separator in another embodiment of the invention.
Figure 2:
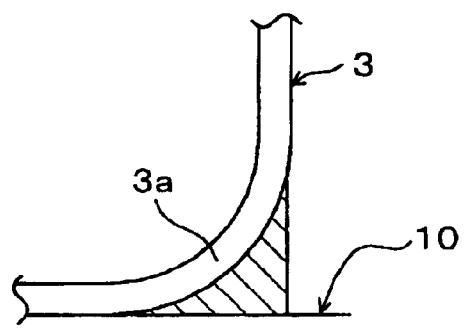
FIG. 2 is a diagram showing a gap allowing a stagnant flow of gas, being formed between bent portion of a separator and an electrode structure.
Figure 3:
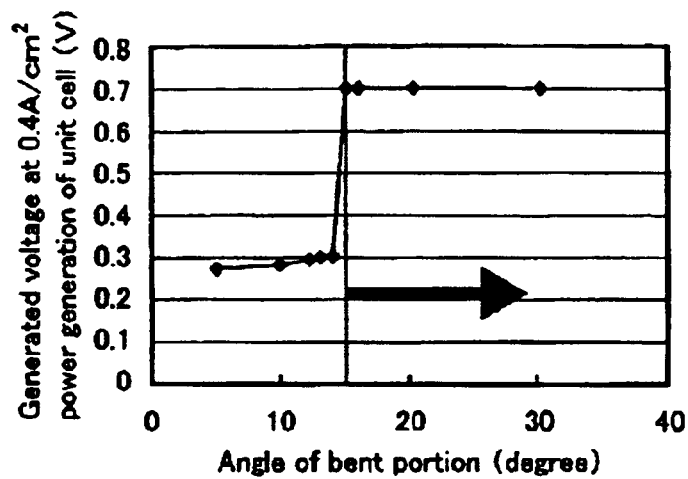
FIG. 3 is a diagram showing the relationship between angle of bent portion forming a gas passage of a separator and generated voltage of a fuel cell.
Figure 4:
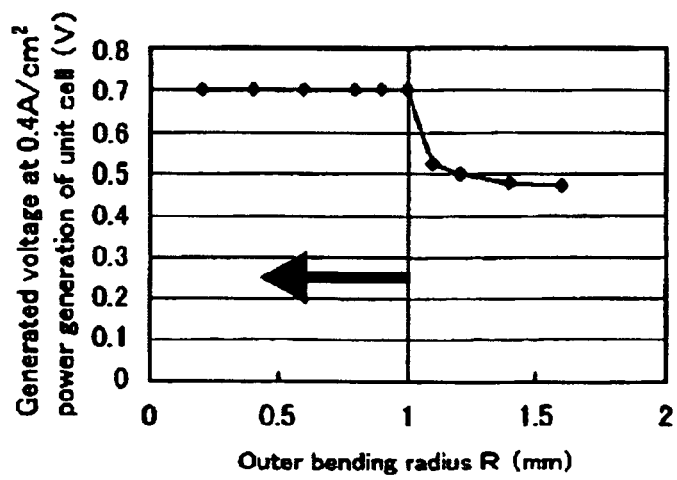
FIG. 4 is a diagram showing the relationship between outer bending radius R of bent portion forming a gas passage of a separator and generated voltage of a fuel cell.
Figure 5:
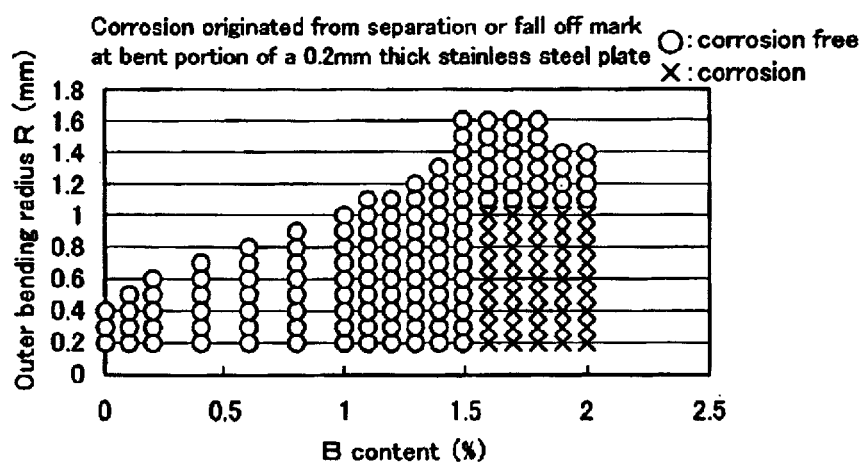
FIG. 5 is a diagram showing the correlation of B content, outer bending radius R, and corrosion state of bent portion of a separator composed of an austenitic stainless steel plate.

Various separators of different combinations of B content and outer bending radius were fabricated by using 0.2 mm thick austenitic stainless steel plates with the content of B variable in a range of 0 to 2 wt. % and the contents of the other elements within the range of the invention, and by press forming with the bending angle of the bent portion constant (15 degrees) and the outer bending radius R ranging from 0.2 to 1.6 mm. Using each separator, a fuel cell was formed, a specified gas was circulated in gas passages to generate power continuously for 3000 hours, and separation, fall off, and corrosion of the bent portion of the separator were observed. FIG. 5 shows the results, in which the ○-mark shows a separator in a sound state free from corrosion originated from separation or fall off mark at the surface, and the X-mark indicates a corroded separator.

(2) Relationship Between B Content and Angle of Bent Portion (Austenitic Stainless Steel)

Figure 6:
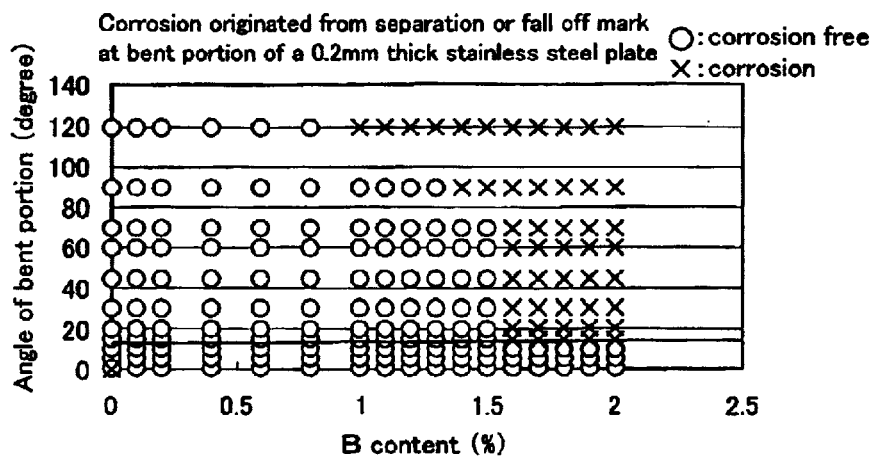
FIG. 6 is a diagram showing the correlation of B content, angle of bent portion, and corrosion state of bent portion of a separator composed of an austenitic stainless steel plate.

Likewise, various separators of different combinations of B content and angle of bent portion were fabricated by using 0.2 mm thick austenitic stainless steel plates with the content of B variable in a range of 0 to 2 wt. % and the contents of the other elements within the range of the invention, and by press forming with the outer bending radius of the bent portion constant (1 mm) and the angle of the bent portion ranging from 0 to 120 degrees. Using each separator, a fuel cell was formed, a specified gas was circulated in gas passages to generate power continuously for 3000 hours, and separation, fall off, and corrosion of the bent portion of the separator were observed. FIG. 6 shows the results, in which the evaluation is indicated by o-marks and X-marks in the same way as in FIG. 5.

According to FIG. 5, if the outer bending radius R is defined to be at 1 mm or less, corrosion occurs unless the B content is 1.5 wt. % or less. According to FIG. 6, if the angle of the bent portion is defined to be at 15 degrees or more, similarly, the B content must be 1.5 wt. % or less. Therefore, in the separators made of austenitic stainless steel plates of the invention, in order to prevent separation and fall off of precipitates of borides or boron carbides due to precipitation by containing B and corrosion originating from fall off marks, the essential conditions are the B content of 1.5 wt. % or less, the outer bending radius R of 1 mm, and angle of the bent portion of 15 degrees or more. However, the content of B must be 0.005 wt. % from the viewpoint of satisfying the necessary precipitation amount for assuring the contact resistance necessary for the separator.

(3) Relationship Between B Content and Outer Bending Radius R (Ferritic Stainless Steel)

Figure 7:
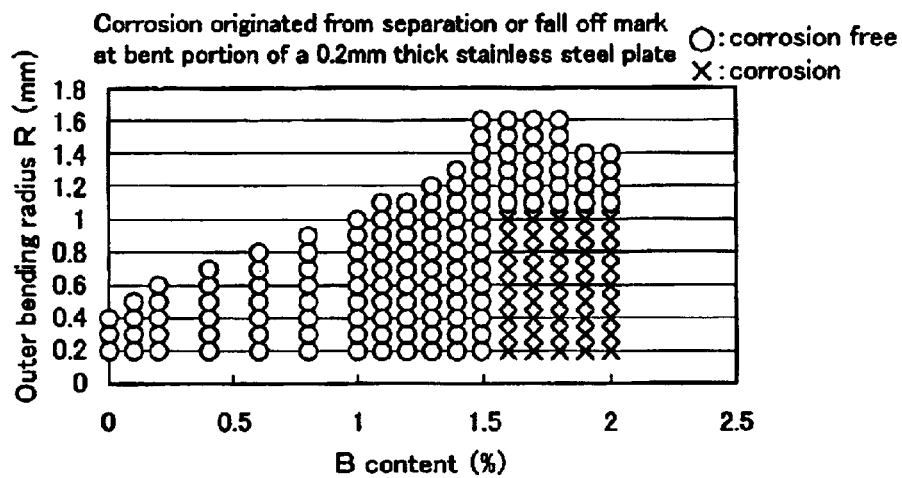
FIG. 7 is a diagram showing the correlation of B content, outer bending radius R, and corrosion state of bent portion of a separator composed of a ferritic stainless steel plate.

Various separators of different combinations of B content and outer bending radius were fabricated by using 0.2 mm thick ferritic stainless steel plates with the content of B variable in a range of 0 to 2 wt. % and the contents of the other elements within the range of the invention, and by press forming with the bending angle of the bent portion constant (15 degrees) and the outer bending radius R ranging from 0.2 to 1.6 mm. Using each separator, a fuel cell was formed, a specified gas was circulated in gas passages to generate power continuously for 3000 hours, and separation, fall off, and corrosion of the bent portion of the separator were observed. FIG. 7 shows the results, in which the evaluation is indicated by o-marks and X-marks in the same way as in FIG. 5.

(4) Relationship Between B Content and Angle of Bent Portion (Ferritic Stainless Steel)

Figure 8:
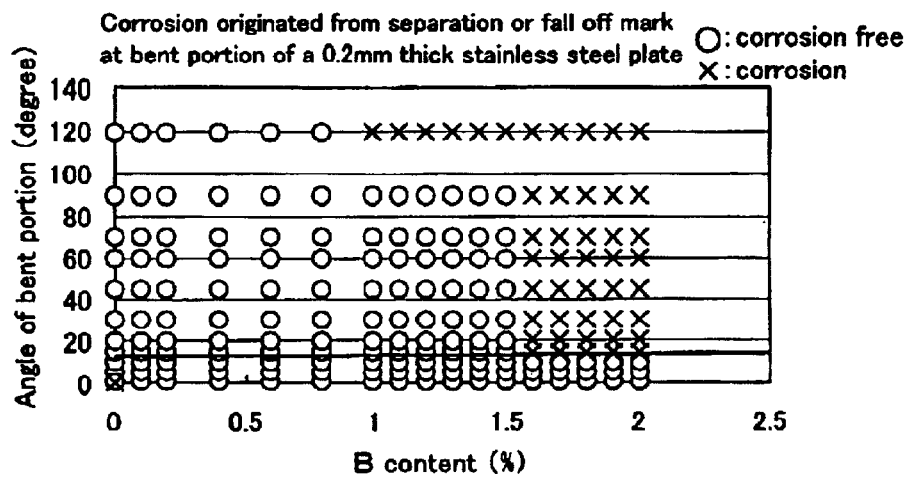
FIG. 8 is a diagram showing the correlation of B content, angle of bent portion, and corrosion state of bent portion of a separator composed of a ferritic stainless steel plate.

Likewise, various separators of different combinations of B content and angle of bent portion were fabricated by using 0.2 mm thick ferritic stainless steel plates with the content of B variable in a range of 0 to 2 wt. % and the contents of the other elements within the range of the invention, and by press forming with the outer bending radius of the bent portion constant (1 mm) and the angle of the bent portion ranging from 0 to 120 degrees. Using each separator, a fuel cell was formed, a specified gas was circulated in gas passages to generate power continuously for 3000 hours, and separation, fall off, and corrosion of the bent portion of the separator were observed. FIG. 8 shows the results, in which the evaluation is indicated by o-marks and X-marks the same way as in FIG. 5.

According to FIG. 7, if the outer bending radius R is defined to be at 1 mm or less, corrosion occurs unless the B content is 1.5 wt. % or less. According to FIG. 8, if the angle of the bent portion is defined to be at 15 degrees or more, similarly, the B content must be 1.5 wt. % or less. Therefore, in the separators made of ferritic stainless steel plates of the invention, in order to prevent separation and fall off of precipitates of borides or boron carbides due to precipitation by containing B and corrosion originating from fall off marks, the essential conditions are the B content of 1.5 wt. % or less, the outer bending radius R of 1 mm, and angle of the bent portion of 15 degrees or more. However, the content of B must be 0.005 wt. % from the viewpoint of satisfying the necessary precipitation amount for assuring the contact resistance necessary for the separator.

(5) Difference in Performance by B Content (Austenitic Stainless Steel)

Figure 9A:
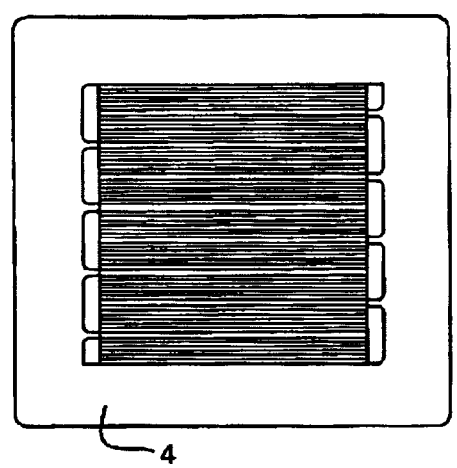
FIG. 9A is a plan of a separator fabricated in Examples.
Figure 9B:
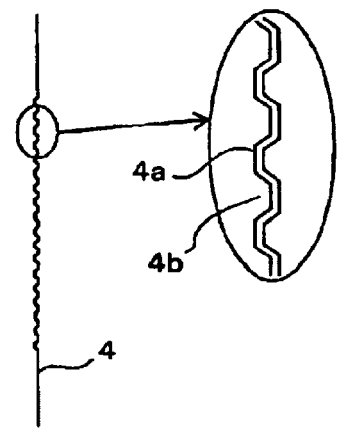
FIG. 9B is its sectional view.

Using 0.2 mm thick austenitic stainless steels having the composition in Example 1 (within scope of the invention) and Comparative Example 1 (out of scope of the invention) shown in Table 1, separators 4 shown in FIGS. 9A and B were fabricated by press forming. As shown in FIG. 9B, the gas passage 4b of the separator 4 was trapezoidal, the angle of the bent portion 4a was 45 degrees, and the outer bending radius R was 0.3 mm. In these separators, the contact resistance and passive state holding current density at 0.9 V were measured. Results of measurement are recorded in FIG. 11. The contact resistance is a through-resistance measured by applying a surface load of 5 kgf/cm$^2$ on two overlaid plies of separators (anode side and cathode side) 4, using a resistance meter. The passive state holding current density refers to the current density corresponding to the rate of corrosion when the oxide forming speed of the stainless steel of the base material becoming an oxide and the speed of the surface oxide film being melted to become ions are equalized, that is, when the thinness of the oxide film no longer changes, and this current density was measured by a constant potential polarization test.

TABLE 1

| | Element content unit: wt. % | | | | | | | | | | | | |
|---|---|---|---|---|---|---|---|---|---|---|---|---|---|
| | C | Si | Mn | P | S | Cu | Ni | Cr | Mo | N | Al | B | Cr + 3Mo − 2.5B |
| Example 1 | 0.018 | 0.65 | 1.02 | 0.028 | 0.0078 | 0.25 | 8.4 | 18.82 | — | 0.025 | 0.015 | 0.12 | 18.52 |
| Example 2 | 0.018 | 0.65 | 1.02 | 0.028 | 0.0078 | 0.25 | 0.21 | 18.82 | — | 0.025 | 0.015 | 0.12 | 18.52 |
| Comparative Example 1 | 0.019 | 0.12 | 0.08 | 0.013 | 0.0008 | 0.08 | 8.4 | 24.76 | — | 0.036 | 0.022 | 2.52* | 18.46 |
| Comparative Example 2 | 0.019 | 0.12 | 0.08 | 0.013 | 0.0008 | 0.08 | 0.01 | 24.76 | — | 0.036 | 0.022 | 2.52* | 18.46 |

*Value out of scope of the invention

Figure 10:
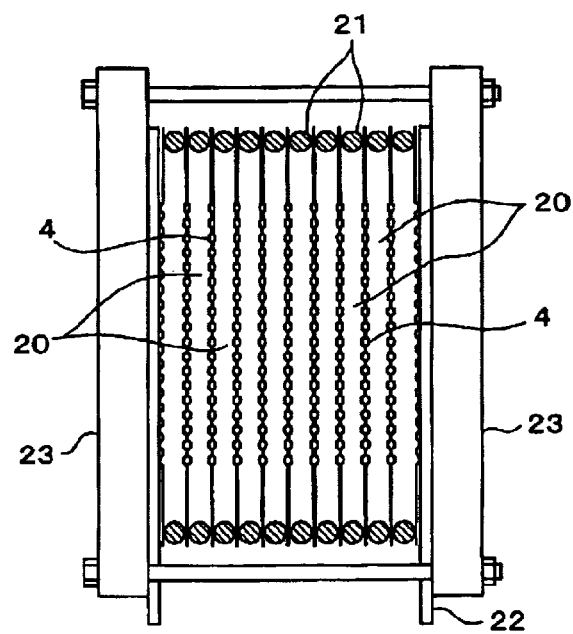
FIG. 10 is a sectional view of a fuel cell stack fabricated in Examples.
Figure 12:
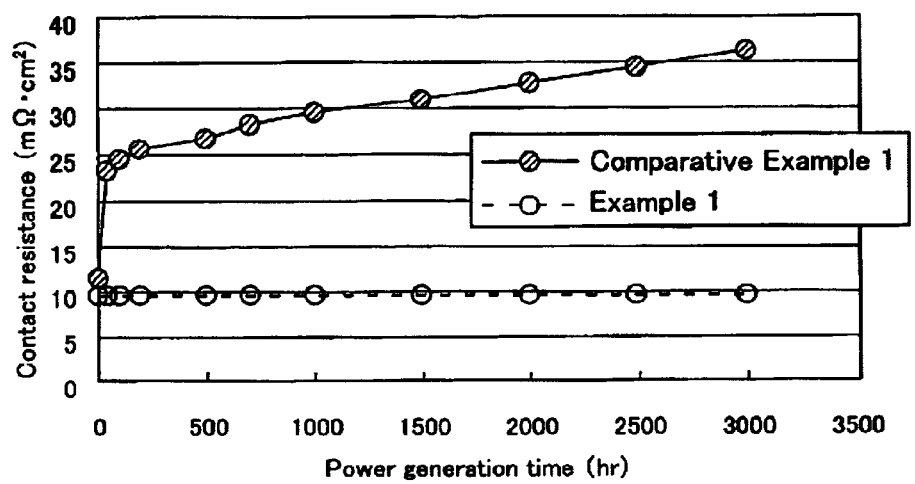
FIG. 12 is a diagram showing changes as time passed of contact resistance of a separator composed of an austenitic stainless steel plate executed in Examples.
Figure 13:
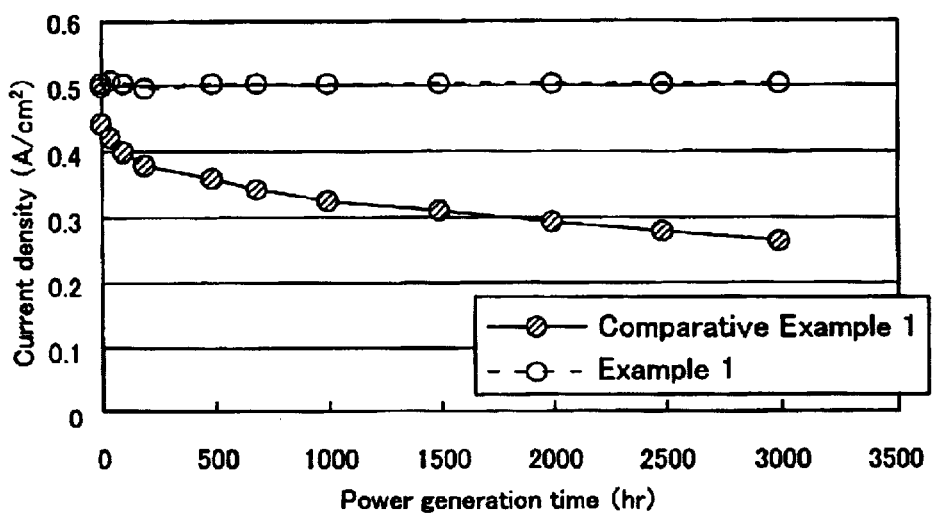
FIG. 13 is a diagram showing changes as time passed of current density of a separator composed of an austenitic stainless steel plate executed in Examples.

Next, as shown in FIG. 10, using ten unit cells 20 composed of electrode structures, a fuel cell stack was composed by laminating by interposing the separator 4 in Example 1 among the unit cells 20. In the diagram, reference numeral 21 is a seal, reference numeral 22 is a current collector plate, and reference numeral 23 is a clamp plate for fixing the laminated state of the fuel cell stack. On the other hand, using the separator of Comparative Example 1, a fuel cell stack was similarly fabricated. Using these fuel cells, power was generated, and the contact resistance from start of power generation until 3000 hours later at intervals of 500 hours, and the current density at 0.7 V power generation of unit cells were measured. Results of the measurements are shown in FIG. 12 and FIG. 13.

Figure 11:
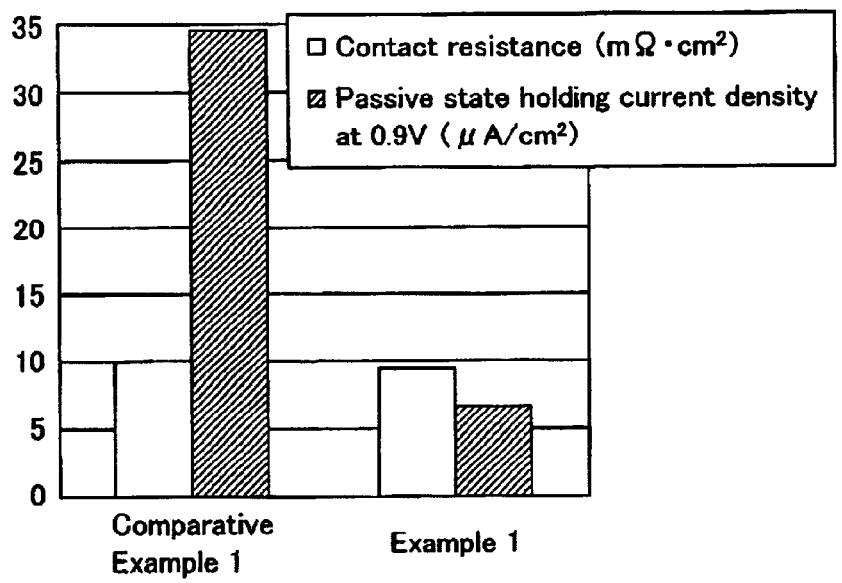
FIG. 11 is a diagram showing results of measurement of contact resistance and passive state holding current density at 0.9 V of a separator composed of an austenitic stainless steel plate executed in Examples.

According to FIG. 11, as far as the contact resistance was concerned, there was no significant difference between Example 1 and Comparative Example 1, but the passive state holding current density at 0.9 V was substantially higher in Comparative Example 1 as compared with Example 1. According to FIG. 12, only upon start of power generation, the contact resistance was low and similar in Example 1 and Comparative Example 1, but Comparative Example 1 began to increase in the contact resistance from immediately after the start of power generation, and further increased as time passed. In contrast, in Example 1, the contact resistance remained at a low level and did not change in spite of generating power for a long period. In addition, according to FIG. 13, only upon start of power generation, the current density was similar in Example 1 and Comparative Example 1, but Comparative Example 1 began to reduce in the current density from immediately after start of power generation, and further reduced as time passed. In contrast, in Example 1, the current density remained at a low level and did not change in spite of power generation for a long period.

(6) Difference in Performance by B Content (Ferritic Stainless Steel)

Using 0.2 mm thick ferritic stainless steels having the composition in Example 2 (within the scope of the invention) and Comparative Example 2 (out of the scope of the invention) shown in Table 1, separators were fabricated in the same way as in Example 1. In these separators, the contact resistance and passive state holding current density at 0.9 V were measured in the same way as above. Results of measurement are recorded in FIG. 14.

Figure 15:
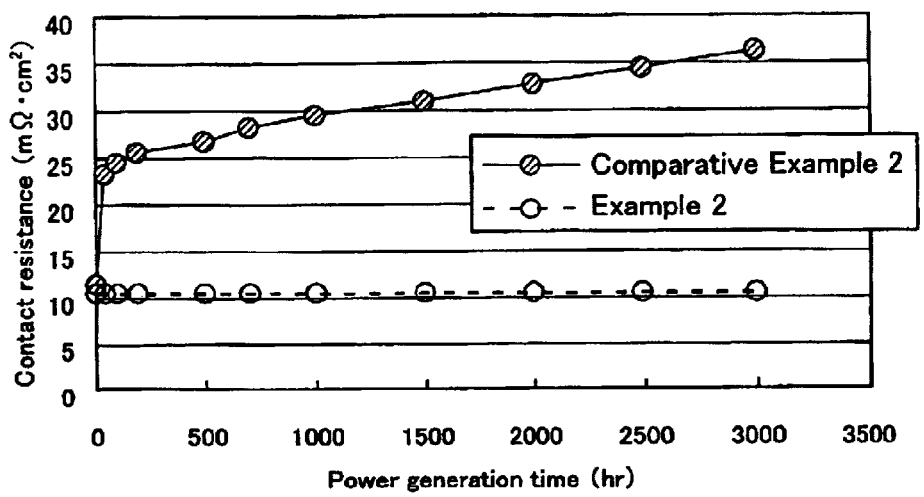
FIG. 15 is a diagram showing changes as time passed of contact resistance of a separator composed of a ferritic stainless steel plate executed in Examples.
Figure 16:
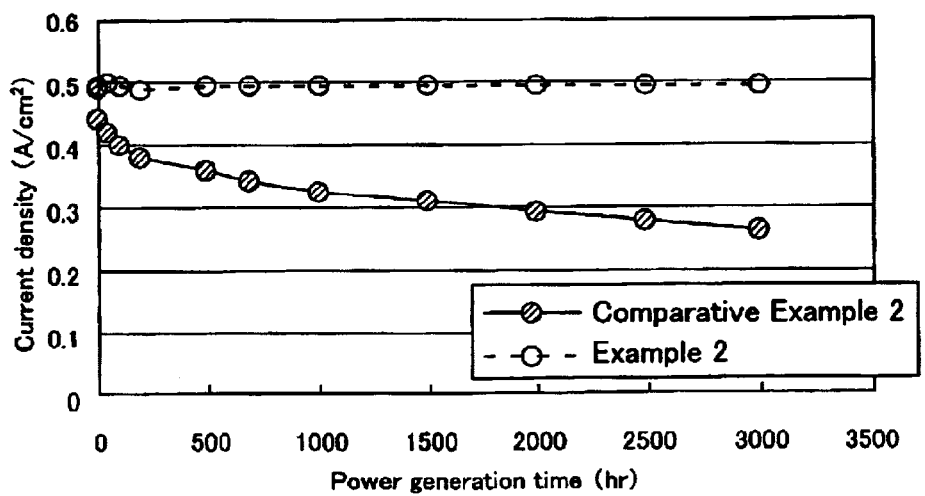
FIG. 16 is a diagram showing changes as time passed of current density of a separator composed of a ferritic stainless steel plate executed in Examples.

Next, in the same way as in Example 1, a fuel cell stack was formed by using the separator of Example 2, and furthermore, a fuel cell was formed by using the separator of Comparative Example 2. Using these fuel cells, power was generated, and the contact resistance from start of power generation until 3000 hours later at intervals of 500 hours, and the current density at 0.7 V power generation of unit cells were measured. Results of measurement are shown in FIG. 15 and FIG. 16.

Figure 14:
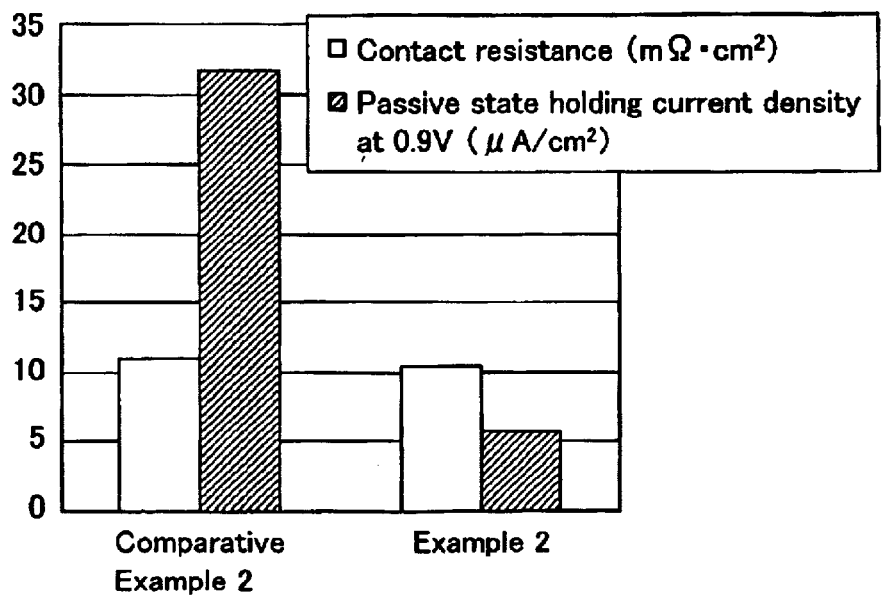
FIG. 14 is a diagram showing results of measurement of contact resistance and passive state holding current density at 0.9 V of a separator composed of a ferritic stainless steel plate executed in Examples.

According to FIG. 14, as far as the contact resistance was concerned, there was no significant difference between Example 2 and Comparative Example 2, but the passive state holding current density at 0.9 V was substantially higher in Comparative Example 2 as compared with Example 2. According to FIG. 15, only upon start of power generation, the contact resistance was low and was similar to that in Example 2 and Comparative Example 2, but Comparative Example 2 began to increase in the contact resistance from immediately after start of power generation, and further increased as time passed. In contrast, in Example 2, the contact resistance remained at a low level and did not change in spite of power generation for a long period. In addition, according to FIG. 16, only upon start of power generation, the current density was similar in Example 2 and Comparative Example 2, but Comparative Example 2 began to decline in the current density from immediately after the start of power generation, and further declined as time passed. In contrast, in Example 2, the current density remained at a low level and did not change in spite of power generation for a long period.

What is claimed is:

1. A press separator for a fuel cell made of an austenitic stainless steel comprising B: 0.005 to 1.5 wt. %, C: 0.15 wt. % or less, Si: 0.01 to 1.5 wt. %, Mn: 0.01 to 2.5 wt. %, P: 0.035 wt. % or less, S: 0.01 wt. % or less, Al: 0.001 to 0.2 wt. %, N: 0.3 wt. % or less, Cu: 0 to 3 wt. %, Ni: 7 to 50 wt. %, Cr: 17 to 30 wt. %, Mo: 0 to 7 wt. %, and balance being Fe and inevitable impurities, with contents of Cr, Mo, and B satisfying the following formula:

$$Cr\ (wt.\ \%) + 3 \times Mo\ (wt.\ \%) - 2.5 \times B\ (wt.\ \%) \geq 17,$$

precipitating at least one of $M_{23}(C, B)_6$ boron carbide, $M_2B$ borides on the surface, and being press formed in continuous corrugations, wherein M means metal, the continuous corrugations consisting of bent portions are formed by folding or elongating in press forming, acute angle of the bent portion with respect to the direction in which the corrugations continue is 15 degrees or more, and outer bending radius R defined by an outer profile of the bent portion is 0.2 to 1 mm.

2. A press separator for a fuel cell made of a bright annealed austenitic stainless steel comprising B: 0.005 to 1.5 wt. %, C: 0.15 wt. % or less, Si: 0.01 to 1.5 wt. %, Mn: 0.01 to 2.5 wt. %, P: 0.035 wt. % or less, S: 0.01 wt. % or less, Al: 0.001 to 0.2 wt. %, N: 0.3 wt. % or less, Cu: 0 to 3 wt. %, Ni: 7 to 50 wt. %, Cr: 17 to 30 wt. %, Mo: 0 to 7 wt. %, and balance being Fe and inevitable impurities, with contents of Cr, Mo, and B satisfying the following formula:

$$Cr\ (wt.\ \%) + 3 \times Mo\ (wt.\ \%) - 2.5 \times B\ (wt.\ \%) \geq 17,$$

precipitating at least one of $M_{23}(C, B)_6$ boron carbide, $M_2B$, and MB borides on the surface, and being press formed in continuous corrugations, wherein M means metal, the continuous corrugations consisting of bent portions are formed by folding or elongating in press forming, acute angle of the bent portion with respect to the direction in which the corrugations continue is 15 degrees or more, and outer bending radius R defined by an outer profile of the bent portion is 0.2 to 1 mm.

\* \* \* \* \*